(12) United States Patent
Gil et al.

(10) Patent No.: US 12,668,382 B2
(45) Date of Patent: *Jun. 30, 2026

(54) UNMANNED AERIAL VEHICLE (UAV) LANDING GEAR SYSTEM FOR HOLDING DELIVERY CANISTERS

(71) Applicant: United Parcel Service of America, Inc., Atlanta, GA (US)

(72) Inventors: Julio Gil, Veldhoven (NL); Julian Bell, Decatur, GA (US)

(73) Assignee: United Parcel Service of America, Inc., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/000,216

(22) Filed: Dec. 23, 2024

(65) Prior Publication Data

US 2025/0132441 A1     Apr. 24, 2025

Related U.S. Application Data

(63) Continuation of application No. 17/711,730, filed on Apr. 1, 2022, now Pat. No. 12,218,370.

(Continued)

(51) Int. Cl.
B64U 60/50 (2023.01)
B64C 25/00 (2006.01)
(Continued)

(52) U.S. Cl.
CPC ............ B64U 60/50 (2023.01); B64C 25/001 (2013.01); B64C 25/34 (2013.01); B64D 1/12 (2013.01);
(Continued)

(58) Field of Classification Search
CPC ........ B64U 10/13; B64U 60/00; B64U 60/50; B64U 2101/64; B64C 25/34; B64C 25/001; B64D 1/12
See application file for complete search history.

(56) References Cited

U.S. PATENT DOCUMENTS 720,395 A     2/1903   Ash et al.
3,948,466 A   4/1976   Rudder et al.
(Continued)

FOREIGN PATENT DOCUMENTS

CH          508541 A     6/1971
CN        102785937 A    11/2012
(Continued)

OTHER PUBLICATIONS

Final Office Action received for U.S. Appl. No. 17/887,812, mailed on Feb. 13, 2025, 20 pages.
(Continued)

*Primary Examiner* — Philip J Bonzell
(74) *Attorney, Agent, or Firm* — Shook, Hardy & Bacon L.L.P.

(57) ABSTRACT

Landing gear, aspects of which are usable by an unmanned aerial vehicle (UAV), comprises a first leg with a first leg landing end and a first leg connection end, and a second leg with a second leg landing end and a second leg connection end. The first leg connection end is directly coupled to the second leg connection end at an engagement location. A tensioning member applies a rotational force about the engagement location, biasing the first leg landing end in the direction of the second leg landing end. The first leg and the second leg are configured to rotate against the rotational force when a downward force is applied to the engagement location.

20 Claims, 4 Drawing Sheets

Related U.S. Application Data

(60) Provisional application No. 63/237,392, filed on Aug. 26, 2021, provisional application No. 63/171,336, filed on Apr. 6, 2021.

(51) Int. Cl.

| | |
|---|---|
| *B64C 25/34* | (2006.01) |
| *B64D 1/12* | (2006.01) |
| *B64D 1/22* | (2006.01) |
| *B64D 9/00* | (2006.01) |
| *B64F 1/32* | (2006.01) |
| *B64U 60/00* | (2023.01) |
| *B64U 10/13* | (2023.01) |
| *B64U 30/20* | (2023.01) |
| *B64U 101/60* | (2023.01) |
| *B64U 101/64* | (2023.01) |

(52) U.S. Cl.
CPC ................. *B64D 1/22* (2013.01); *B64D 9/00* (2013.01); *B64F 1/32* (2013.01); *B64U 60/00* (2023.01); *B64U 10/13* (2023.01); *B64U 30/20* (2023.01); *B64U 2101/60* (2023.01); *B64U 2101/64* (2023.01); *H01M 2220/20* (2013.01)

(56) References Cited

U.S. PATENT DOCUMENTS

| | | | |
|---|---|---|---|
| 4,416,197 | A | 11/1983 | Kehl |
| 5,508,908 | A | 4/1996 | Kazama et al. |
| 5,697,625 | A | 12/1997 | Otto |
| 5,760,569 | A | 6/1998 | Chase, Jr. |
| 5,799,909 | A | 9/1998 | Ziegler |
| 5,868,357 | A | 2/1999 | Gabriel |
| 6,179,357 | B1 | 1/2001 | Gabriel |
| 6,310,771 | B1 | 10/2001 | Chien |
| 6,554,151 | B1 | 4/2003 | Brennan |
| 6,674,052 | B1 | 1/2004 | Luo |
| 7,509,995 | B2 | 3/2009 | Bhatti et al. |
| 7,631,444 | B1 | 12/2009 | Hursen |
| 7,635,065 | B1 | 12/2009 | Pettinger |
| 9,027,777 | B1 | 5/2015 | Steidinger, III |
| 9,033,281 | B1 | 5/2015 | Adams |
| 9,280,038 | B1 | 3/2016 | Pan et al. |
| 9,387,928 | B1 | 7/2016 | Gentry et al. |
| 9,412,280 | B1 | 8/2016 | Zwillinger et al. |
| 9,525,605 | B2 | 12/2016 | Wu et al. |
| 9,527,605 | B1 | 12/2016 | Gentry et al. |
| 9,650,133 | B2 | 5/2017 | Fisher et al. |
| 9,676,481 | B1 | 6/2017 | Buchmueller |
| 9,688,404 | B1 | 6/2017 | Buchmueller et al. |
| 9,957,048 | B2 | 5/2018 | Gil |
| 9,969,494 | B1 | 5/2018 | Buchmueller et al. |
| 9,981,745 | B2 | 5/2018 | Gil |
| 10,040,370 | B2 | 8/2018 | Wei et al. |
| 10,071,804 | B1 | 9/2018 | Buchmueller et al. |
| 10,246,187 | B2 | 4/2019 | Cantrell et al. |
| 10,274,952 | B2 | 4/2019 | Cantrell et al. |
| 10,435,156 | B2 | 10/2019 | Bellof et al. |
| 10,640,214 | B2 | 5/2020 | Lopez et al. |
| 10,807,714 | B2 | 10/2020 | Atchley et al. |
| 10,836,406 | B2 | 11/2020 | Lum et al. |
| 10,899,449 | B2 | 1/2021 | Luckay et al. |
| 11,187,200 | B1 | 11/2021 | Kolbe et al. |
| 11,225,325 | B1 | 1/2022 | Evans, II |
| 11,345,051 | B2 | 5/2022 | Zheng et al. |
| 11,453,498 | B2 | 9/2022 | Martens |
| 11,630,459 | B2 | 4/2023 | Georgeson et al. |
| 11,667,383 | B2 | 6/2023 | Evans, II |
| 12,195,198 | B2 | 1/2025 | Columbus |
| 2005/0000967 | A1 | 1/2005 | Najd |
| 2005/0023284 | A1 | 2/2005 | Heiberg et al. |
| 2007/0202751 | A1 | 8/2007 | Wentz et al. |
| 2008/0083756 | A1 | 4/2008 | Daniels |
| 2009/0198372 | A1 | 8/2009 | Hammerslag |

| | | | |
|---|---|---|---|
| 2014/0091172 | A1 | 4/2014 | Arlton et al. |
| 2014/0180914 | A1 | 6/2014 | Abhyanker |
| 2015/0197389 | A1 | 7/2015 | Bao et al. |
| 2016/0039300 | A1 | 2/2016 | Wang et al. |
| 2016/0068264 | A1 | 3/2016 | Ganesh et al. |
| 2016/0140851 | A1 | 5/2016 | Levy et al. |
| 2016/0257423 | A1 | 9/2016 | Martin |
| 2017/0015415 | A1 | 1/2017 | Chan et al. |
| 2017/0021923 | A1 | 1/2017 | Fisher et al. |
| 2017/0029101 | A1 | 2/2017 | Weissenberg |
| 2017/0038116 | A1 | 2/2017 | Ros |
| 2017/0217323 | A1 | 8/2017 | Antonini et al. |
| 2017/0313421 | A1 | 11/2017 | Gil |
| 2017/0316375 | A1 | 11/2017 | Gil |
| 2017/0349039 | A1 | 12/2017 | Rayner et al. |
| 2017/0368959 | A1 | 12/2017 | Hara et al. |
| 2018/0002015 | A1 | 1/2018 | Mccullough et al. |
| 2018/0062225 | A1 | 3/2018 | You et al. |
| 2018/0105063 | A1 | 4/2018 | Wei et al. |
| 2018/0160525 | A1 | 6/2018 | Satake et al. |
| 2018/0265222 | A1 | 9/2018 | Takagi |
| 2018/0312069 | A1 | 11/2018 | McClymond |
| 2018/0370618 | A1 | 12/2018 | Harris |
| 2019/0144007 | A1 | 5/2019 | Lum et al. |
| 2019/0291865 | A1 | 9/2019 | O'Donnell |
| 2020/0047353 | A1 | 2/2020 | Zheng et al. |
| 2021/0197982 | A1 | 7/2021 | Sweeny et al. |
| 2021/0229903 | A1 | 7/2021 | Goines, Jr. |
| 2022/0035381 | A1 | 2/2022 | Okuno et al. |
| 2022/0134899 | A1 | 5/2022 | Eide et al. |
| 2022/0315222 | A1 | 10/2022 | Gil et al. |
| 2022/0315246 | A1 | 10/2022 | Gil et al. |
| 2022/0320669 | A1 | 10/2022 | Gil et al. |
| 2022/0380063 | A1 | 12/2022 | Shah et al. |
| 2023/0008634 | A1 | 1/2023 | Kabakov et al. |
| 2023/0060684 | A1 | 3/2023 | Bell |
| 2023/0063715 | A1 | 3/2023 | Bell |
| 2023/0131957 | A1 | 4/2023 | Lowenberg et al. |
| 2023/0294847 | A1 | 9/2023 | Columbus |
| 2024/0387930 | A1 | 11/2024 | Bell |

FOREIGN PATENT DOCUMENTS

| | | | |
|---|---|---|---|
| CN | 110398983 | A | 11/2019 |
| CN | 110963033 | A | 4/2020 |
| CN | 112230672 | A | 1/2021 |
| CN | 113183824 | A | 7/2021 |
| DE | 102017209263 | A1 | 12/2018 |
| EP | 1993940 | A1 | 11/2008 |
| EP | 2644438 | A2 | 10/2013 |
| EP | 2868577 | A1 | 5/2015 |
| EP | 3177528 | A1 | 6/2017 |
| FR | 2685547 | A1 | 6/1993 |
| FR | 3075170 | A1 | 6/2019 |
| GB | 2605454 | A | 10/2022 |
| JP | 53-045890 | A | 4/1978 |
| JP | 01-176720 | A | 7/1989 |
| JP | 2017-083063 | A | 5/2017 |
| JP | 6176309 | B2 | 8/2017 |
| JP | 7616699 | B2 | 1/2025 |
| KR | 10-1778883 | B1 | 9/2017 |
| KR | 10-2019-0069968 | A | 6/2019 |
| KR | 10-2021105 | B1 | 9/2019 |
| KR | 10-2023-0164329 | A | 12/2023 |
| KR | 10-2024-0143483 | A | 10/2024 |
| WO | 95/21361 | A1 | 8/1995 |
| WO | 2015/061008 | A1 | 4/2015 |
| WO | 2015/158394 | A1 | 10/2015 |
| WO | 2015/158934 | A1 | 10/2015 |
| WO | 2016/019978 | A1 | 2/2016 |
| WO | 2020/184166 | A1 | 9/2020 |
| WO | 2020/235744 | A1 | 11/2020 |
| WO | 2021/101735 | A1 | 5/2021 |

OTHER PUBLICATIONS

Office action received for Canadian Patent Application No. 3211899, mailed on Jan. 14, 2025, 4 pages.

(56)          References Cited

OTHER PUBLICATIONS

Non-Final Office Action received for U.S. Appl. No. 17/887,812, mailed on Jun. 11, 2025, 19 pages.

Office Action received for Canadian Patent Application No. 3227086, mailed on Jun. 27, 2025, 5 pages.

Final Office Action received for U.S. Appl. No. 17/711,739, mailed on Apr. 16, 2025, 10 pages.

Non-Final Office Action received for U.S. Appl. No. 17/712,451, mailed on Mar. 10, 2025, 10 pages.

Notice of Allowance received for U.S. Appl. No. 18/788,975, mailed on Apr. 9, 2025, 8 pages.

Non-Final Office Action received for U.S. Appl. No. 17/711,739, mailed on Aug. 12, 2025, 9 pages.

Non-Final Office Action received for U.S. Appl. No. 18/799,857, mailed on Oct. 1, 2025, 10 pages.

Non-Final Office Action received for U.S. Appl. No. 17/895,724, mailed on Feb. 2, 2026, 13 pages.

Non-Final Office Action received for U.S. Appl. No. 18/917,708, mailed on Jan. 14, 2026, 5 pages.

UNMANNED AERIAL VEHICLE (UAV) LANDING GEAR SYSTEM FOR HOLDING DELIVERY CANISTERS

CROSS-REFERENCE TO RELATED APPLICATIONS

This application is a continuation of U.S. patent application Ser. No. 17/711,730, filed Apr. 1, 2022, and entitled "Unmanned Aerial Vehicle (UAV) Landing Gear System for Holding Delivery Canisters," which claims the benefit of priority to U.S. Provisional Application No. 63/171,336, filed Apr. 6, 2021, entitled "Pneumatic Platform and Payload Containers for Unmanned Aerial Vehicles"; and further the benefit of priority to U.S. Provisional Application No. 63/237,392, filed Aug. 26, 2021, entitled "Pneumatic Platform and Payload Containers for Unmanned Aerial Vehicles." Each of the aforementioned applications is expressly incorporated herein by reference in its entirety.

BACKGROUND

Unmanned Aerial Vehicles (UAVs) are used to deliver goods. Some logistics companies have recently started to commercially deliver parcels using UAVs, sometimes referred to as "drones" for short. The majority of deliveries performed by UAVs include relatively small, light parcels.

One current use case for UAV delivery involves delivering critical medical supplies or lab samples. UAVs have significantly reduced the delivery time historically experienced through traditional delivery methods. This has resulted in the faster processing of lab samples and more rapid deployment of critical medical supplies during emergencies.

SUMMARY

This summary is intended to introduce a selection of concepts in a simplified form that are further described below in the detailed description section of this disclosure. This summary is not intended to identify key or essential features of the claimed subject matter, nor is it intended to be used as an aid in determining the scope of the claimed subject matter.

At a high level, aspects described herein relate to a landing gear system that can be used with unmanned aerial vehicles (UAVs) to retrieve and release canisters. A canister can include an object for delivery or a canister suitable for carrying objects for delivery.

To retrieve and release canisters, the landing gear comprises a first leg and a second leg. Each of the first leg and the second leg can include a curved portion. The curved portion may be used to secure the canister for delivery.

The first leg and the second leg are rotationally engaged at a first leg connection end and a second leg connection end, respectively. A tensioning member applies a rotational force about the engagement location, biasing the first leg toward the second leg. Each of the first leg and the second leg respectively have a first wheel and a second landing wheel. Each of the first landing wheel and the second landing wheel rotate in the same plane of rotation, such that the first wheel is configured to move away from the second landing wheel as the first leg and the second leg are rotated against the bias.

To retrieve a canister, the landing gear may be positioned proximate the canister. A gap between the first landing wheel and the second landing wheel can be positioned above the canister. As the UAV descends, the canister is secured into place by the first leg and the second leg. To release, the landing legs are rotated against the bias. One method of doing so includes landing the UAV, and placing the rotors into a reverse thrust. This causes the first landing wheel to move away from the second landing wheel, and rotate the first and second legs against the bias, releasing the canister.

Additional objects, advantages, and novel features of the technology will be set forth in part in the description which follows, and in part will become apparent to those skilled in the art upon examination of the following or learned by practice of the technology.

BRIEF DESCRIPTION OF THE DRAWINGS

The present technology is described in detail below with reference to the attached drawing figures, wherein.

DETAILED DESCRIPTION

Figures 1, 2A:
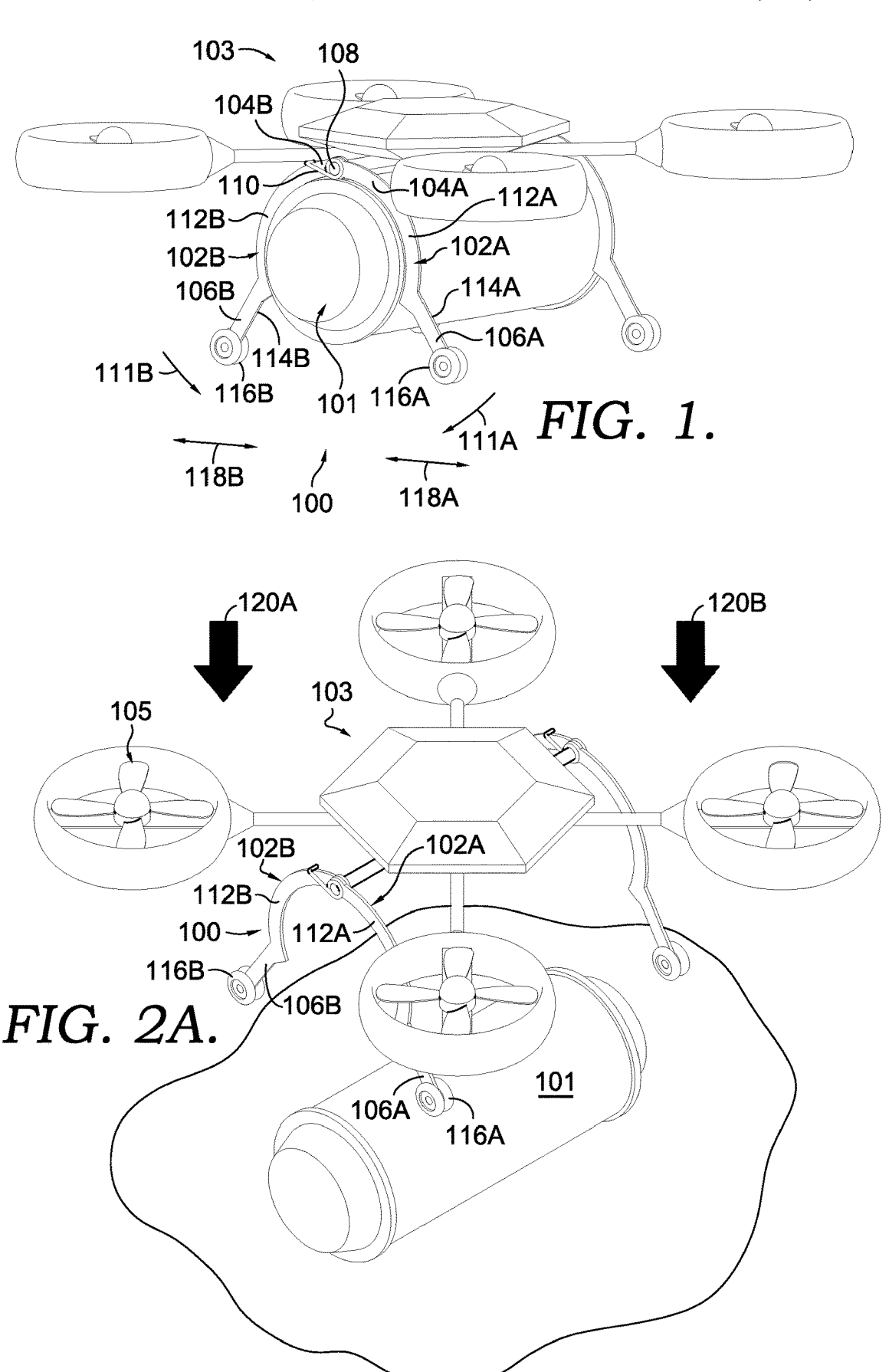
FIG. 1 is a UAV having example landing gear suitable for securing a canister, in accordance with an aspect described herein.
FIGS. 2A-2B illustrate a method of using a UAV comprising example landing gear to secure a canister, in accordance with an embodiment described herein.

As noted, UAVs have been used to deliver objects. One challenge is the loading and unloading of UAVs. Many UAVs are small and deliver relatively low-weight objects. As such, the inclusion of additional devices for retrieving and releasing parcels can increase the weight of a UAV, which reduces battery efficiency and the maximum load capacity.

The present disclosure provides for a landing gear system that can also be used to retrieve objects, such as canisters, and release them using rotor adjustments. The dual-use features of the landing gear system save weight and allow for conventional UAV equipment, such as the rotors, to assist in retrieval and release. Further, since some of the landing gear systems described herein utilize current UAV equipment to facilitate releasing and retrieving objects, the landing gear systems may be installed on a number of UAVs and UAV types to assist in delivery without substantial modification to the aircraft or its design.

One example landing gear system includes landing gear comprising a first leg and a second leg. The first leg comprises a first leg connection end opposite a first leg landing end. The second leg comprises a second leg connection end opposite a second leg landing end. The first leg and the second leg are rotationally coupled at the first leg connection end and the second leg connection end.

A tensioning member provides a rotational force about the engagement location. The rotational force biases the first leg in the direction of the second leg. That is, the first leg landing end is biased toward the second leg landing end about the engagement location.

Each of the first leg and the second leg respectively comprises a first curved portion and a second curved portion. The first curved portion of the first leg curves outward and away from the second leg, while the second leg curved portion of the second leg curves outward and away from the first leg. The diameter of the curved portions is about the diameter of a canister that can be secured by the first and second legs. The first curved portion may extend from the first leg connection end, and the second curved portion may extend from the second leg connection end.

The first leg and the second leg respectively comprise a first straight portion and a second straight portion. The first straight portion extends from the first leg landing end toward the first curved portion. The second straight portion extends from the second leg landing end toward the second curved portion. In some cases, the first leg curved portion adjoins the second leg straight portion, and the second leg curved portion adjoins the second leg straight portion.

A first landing wheel is coupled to the first leg landing end, and a second landing wheel is coupled to the second leg landing end. The first landing wheel is configured to move away from the second landing wheel when the first leg and second leg are rotated against the bias. For example, each of a first axel of the first wheel and a second axel of the second wheel, about which the wheels respectively rotate, are parallel so that the wheels rotate in a same plane of rotation.

Using this configuration, a UAV can retrieve a canister by descending or lowering the landing gear over the canister. The canister contacts the first leg and the second leg, causing each to rotate against the bias. This allows the canister to move from the straight portions into the first and second curved portions, where it is secured for delivery. To release the canister, the UAV can land and place the rotors into a reverse thrust. This generates a downward force on the UAV and causes the first landing wheel and second landing wheel to move away from one another, which further causes the first leg and the second leg to rotate against the bias, thereby releasing the canister.

It will be realized that the systems previously described are only examples that can be practiced from the description that follows, and it is provided to more easily understand the technology and recognize its benefits. Additional examples are now described with reference to the figures.

Turning now to FIG. 1, to transport canisters, some UAVs may include specialized landing gear. FIG. 1 illustrates example landing gear 100 securing an example canister 101. Landing gear 100 is coupled to an example UAV 103.

It should be understood that while landing gear 100, and other landing gear systems described herein, are described in use with an unmanned systems, the illustrations and associated discussion are meant as examples only, and any of the landing gear systems described herein could also be used in conjunction with a manned delivery system.

In general, UAV 103 and other UAV systems described herein, are illustrated as four-rotor vertical take-off and landing systems (VTOL). Again, such systems are illustrative examples in which the described landing gear systems can be employed. Other VTOL systems, whether manned or unmanned, could be used.

As noted, landing gear 100 is being used to secure canister 101. Canister 101 is intended as an example of a type of canister that can be used with the technology. In the example illustrated, canister 102 is a cylindrical canister having a chamber within it suitable for holding items for delivery. The example illustrated is not meant to limit the types of canister or objects that can be secured and transported by UAV 103. Other objects having different dimension corresponding to the dimensions of other landing gear can be employed. Canister 101 can be any of canister, such as a polymer canister, cylindrical packaging, or other like delivery device. In an aspect, canister 101 illustrates the object of delivery, itself. That is, in other example use cases, the particular item being delivered may have a shape corresponding to the landing gear, and the UAV may use similar landing gear to pick up and deliver the object. Such embodiments are contemplated within the scope of this disclosure.

UAV 103 comprises example landing gear 100 suitable for retrieving and releasing canister 101. Landing gear 100 comprises first landing leg 102A and second landing leg 102B. Landing gear 100 may be part of a landing gear system having one or more landing gear, such as landing gear 100.

In this particular example, landing gear 100 comprises first leg 102A and second leg 102B. First leg 102A comprises first leg connection end 104A that extends to first leg landing end 106A. Similarly, second leg 102B comprises second leg connection end 104B that extends to second leg landing end 106B.

In some cases, first leg connection end 104A is configured to rotationally engage second leg connection end 104B by rotationally coupling first leg connection end 104A to second leg connection end 104B at engagement location 108. As an example, a rotational hinge, a rotational socket, or the like can be provided at engagement location 108 and used to couple first leg connection end 104A and second leg connection end 104B. In some cases, the rotational hinge or socket is formed from first leg connection end 104A and second leg connection end 150B.

FIG. 1 further illustrates tensioning member 110 at engagement location 108. While illustrated at a location corresponding to engagement location 108, it will be understood that tensioning member 110 may be provided at other suitable locations. In general, tensioning member 110 applies a rotational force on one or both of first leg connection end 104A and second leg connection end 104B to rotate about engagement location 108. In a particular example, tensioning member 110 exerts a rotational force about engagement location 108 such that the rotational force biases first leg connection end 104A in the direction of second leg connection end 104B when first leg 102A and second leg 102B are rotationally engaged. In the example provided by FIG. 1, arrow 111A illustrates the bias direction relative to first leg connection end 104A caused by the force applied by tensioning mechanism 110, while arrow 111B illustrates the bias direction relative to second leg connection end 104B caused by the force applied by tensioning mechanism 110. It will be understood, that tensioning mechanism 110 may bias either or both of first leg connection end 104A and second leg connection end 104B.

As illustrated, first leg 102A comprises first leg curved portion 112A that is adjacent to first leg connection end 104A and curves outward and away from second leg 102B when first leg 102A and second leg 102B are rotationally engaged. Put another way, first leg curved portion 112A extends from first leg connection end 104A and extends over at least a portion of first leg 102A. Further, second leg 102B may comprise second leg curved portion 112B that is adjacent to second leg connection end 104B and curves outward and away from first leg 102A when first leg 102A and second leg 102B are rotationally engaged. Likewise, second leg curved portion 112B can extend from second leg connection end 104B and extend over at least a portion of second leg 102B.

In some aspects, first leg 102A may comprise first leg straight portion 114A adjacent to first leg landing end 106A. That is, first leg straight portion 114A extends from first leg landing end 106A and extends over at least a portion of first leg 102A. In cases where first leg 102A also includes first leg curved portion 112A, first leg curved portion 112A may extend to first leg straight portion 114A, and likewise, first leg straight portion 114A may extend to first leg curved portion 112A. In some cases, each extends to a first leg third portion disposed between first leg straight portion 114A and first leg curved portion 112A.

In a similar fashion, some aspects of second leg 102B comprise second leg straight portion 114B adjacent to second leg landing end 106B. Second leg straight portion 114B extends from second leg landing end 106B and extends over at least a portion of second leg 102B. In cases where second leg 102B also includes second leg curved portion 112B, second leg curved portion 112B may extend to second leg straight portion 114B, and likewise, second leg straight portion 114B may extend to second leg curved portion 112B. In some cases, each extends to a second leg third portion disposed between second leg straight portion 114B and second leg curved portion 112B.

In one implementation, first leg straight portion 114A extends outward and away from second leg 102B, moving in the direction from first leg connection end 104A toward first leg landing end 106A, when first leg 102A and second leg 102B are rotationally engaged, and second leg straight portion 114B extends outward and away from first leg 102A, moving in the direction from second leg connection end 104B toward second leg landing end 106B.

The example landing gear 100 provided by FIG. 1 is also illustrated such that first leg landing end 106A comprises first landing wheel 116A, and second leg landing end 1506B comprises second landing wheel 116B. While the illustration shows conventional tires being provided as the wheels of landing gear 100, it will be understood that "wheel" is more broadly used to encompass any device that assists in movement of the landing gear along a surface. This could in include other types of systems, such as a ball system, a track system, or the like, and is even intended to include objects such as slick pads that have relatively low coefficient of friction allowing them to easily slide across a surface. It will also be understood that a landing wheel described herein may comprise one or more landing wheels are part of system.

In some cases, first landing wheel 116A is configured to move in a direction away from second landing wheel 116B. Similarity, first landing wheel 116A can also be configured to move toward second landing wheel 116B based on the directional placement of the wheel. For example, when first landing wheel 116A is moves in a direction away from second landing wheel 116B, first leg 102A is rotating about engagement location 108 against the bias. Second leg 102A may also rotate about the engagement location 108 against the bias based on the wheel configuration. In the same sense, first landing wheel 116A can also move toward second landing wheel 116B based on the directional placement of the wheel, and in doing so, first leg 102A is rotated about engagement location 108 in the direction of the bias. Similarly, second leg 102A may also rotate about the engagement location 108 in the direction of the bias. The direction of movement of first landing wheel 116A and second landing wheel 116B is respectively illustrated using first arrow 118A and second arrow 118B.

In an aspect, to facilitate movement of first let 102A and second leg 102B, each of first landing wheel 116A and second landing wheel 116B is respectively associated with first axel 224A and second axel 224B, about which each of first landing wheel 116A and second landing wheel 116B rotate. In the example illustrated, first axel 124A extends parallel relative to second axel 124B. As such, first landing wheel 116A and second landing wheel 116B may each rotate within a same theoretical plane of rotation 126, illustrated in FIG. 2B.

In use, canister 101 can be secured by landing gear 100 within first leg curved portion 112A and second leg curved portion 112B. Canister 101 is held in place by the bias that causes first leg 102A and second leg 102B to exert a force on canister 101. In some cases, such as those using bi-stable hinges, canister 101 is held in place based on the retained and relative position of first leg 102A and second leg 102B, as canister 101 is not able to fall through a gap between first leg 102A and second leg 102B. This can be done in addition to or in lieu of providing pressure against canister 101 for retention.

Figure 2B:
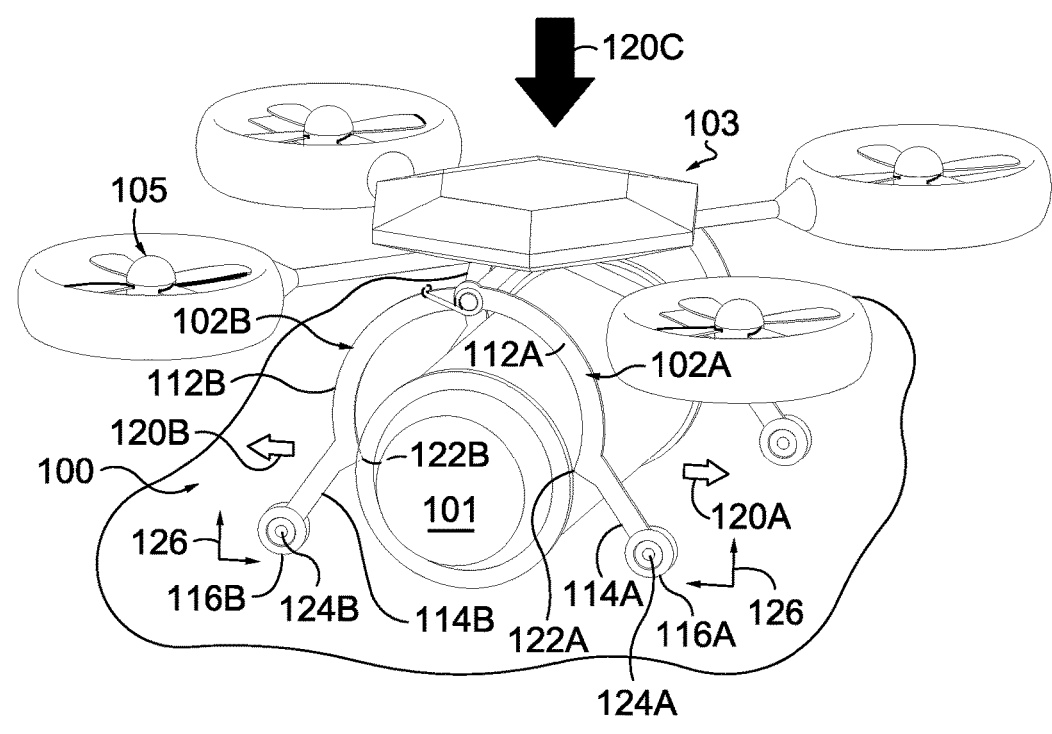

Referencing now FIGS. 2A-2B, the figures illustrate a method of using landing gear 100 to secure canister 101 using UAV 103. As illustrated, landing gear 100 comprises first leg 102A and second leg 102B. Landing gear 100 may comprise additional legs, which are not described in detail for brevity.

Canister 101 can be picked up and secured using UAV 103. In particular, UAV 103 is positioned so that the gap between first leg 102A and second leg 102B is proximate (e.g., above) canister 101 (i.e., a gap between first landing wheel 116A and second landing wheel 116B). The rotors of UAV 103, such as rotor 105, are placed in reverse thrust, causing UAV 103 to experience a downward force, illustrated by downward arrows 120A and 120B. In some cases, the speed of the rotors of UAV 103 is reduced causing UAV 103 to descend due to gravitational force.

Shown in FIG. 2B, as UAV 103 moves downward, illustrated by downward arrow 120C, first leg 102A and second leg 102B contact canister 101. As UAV 103 continues to move downward, first landing wheel 116A and second landing wheel 116B move away from one another against the direction of the bias. That is, first leg landing end 106A and second leg landing end 106B move away from one another against the bias. In doing so, the gap increases and canister 101 moves through the gap and into the secured position. UAV 103 can navigate away with canister 101 in the secured position.

For example, as UAV 103 moves downward, as illustrated using downward arrow 120C, canister 101 is moved to a position between first leg 102A and second leg 102B. As UAV 103 continues downward movement, due to the shape of landing gear 100, canister 101 contacts first leg 102A. This causes first leg 102A to be pushed against its bias and move in the direction illustrated by arrow 120A. For example, first leg 102A may move in a direction away from second leg 102B. Similarly, as UAV 103 continues downward movement, due to the shape of landing gear 100, canister 101 contacts second leg 102B. This causes second leg 102B to be pushed against its bias and move in the direction illustrated by arrow 120B. For example, second leg 102B may move in a direction away from first leg 102A. With continued downward movement, canister 101 is moved to a position between first leg curved portion 112A and second leg curved portion 112B. Together first leg curved portion 112A and second leg curved portion 112B may have a diameter that is the same, or substantially the same as, a diameter of canister 101, when each is in the unbiased position. In some configurations, first leg curved portion 112A and second leg curved portion 112B may have a diameter that is less than the diameter of canister 101, when each is in the unbiased position. As such, as canister 101 moves to a position between first leg curved portion 112A and second leg curved portion 112B, each of first leg 102A and second leg 102B may move back in the direction of the bias, and in doing so, secure canister 101 using first leg 102A and second leg 102B, such as illustrated in the configuration provided by FIG. 1. Referencing again. FIG. 2B, when securing canister 101, canister 101 may contact first leg 102A at a first location 122A corresponding to a location where first leg curved portion 112A adjoins first leg straight portion 114A. Likewise, canister 101 may contact second leg 102B at a second location 122B corresponding to a location where second leg curved portion 112B adjoins first leg straight portion 114B.

Figure 3:
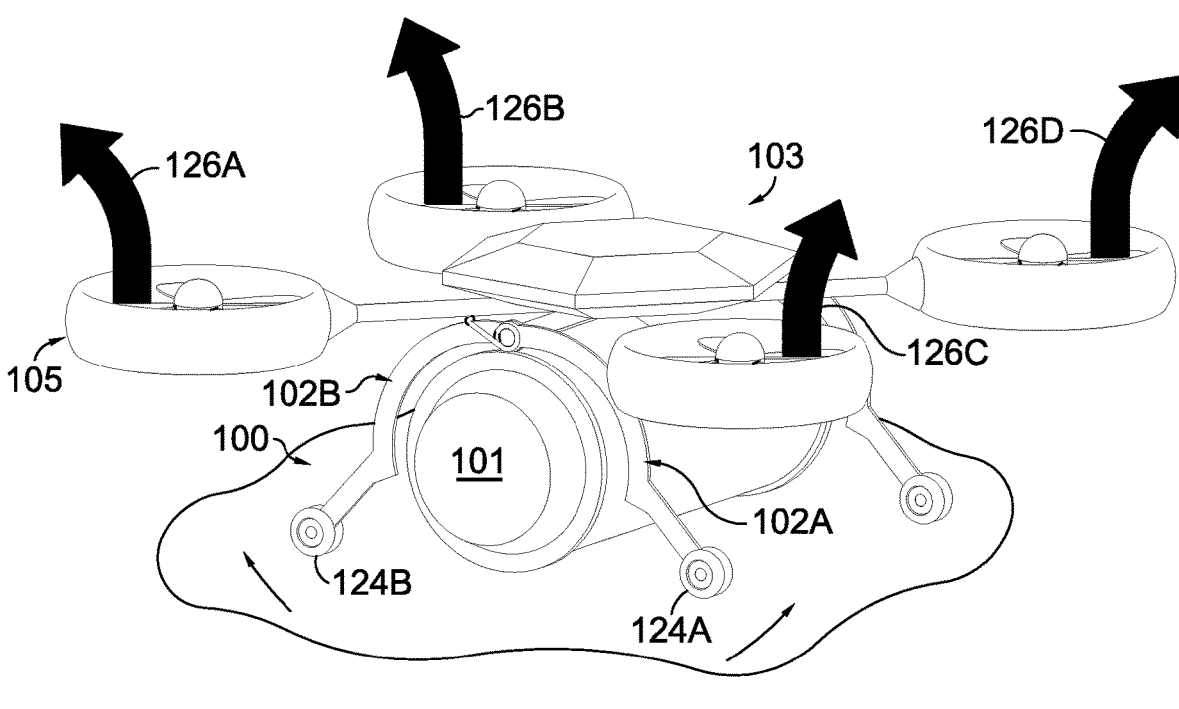
FIG. 3 illustrates a method of using a UAV comprising example landing gear to release a canister, in accordance with an embodiment described herein.

With reference now to FIG. 3, the figure illustrates an example process of releasing canister 101 using example landing gear 100 of UAV 303. One method of releasing canister 101 comprises navigating UAV 103 to a location and landing on a surface at the location. Rotors, such as rotor 105, of UAV 103 are then put into a reverse thrust, which causes air to move from the bottom of the rotors upward through the rotors, as illustrated in FIG. 3 using arrows 126A-126D. In doing so, UAV 103 experiences a downward force. Due to the downward force, first landing wheel 116A and second landing wheel 116B move away from one another against the direction of the bias. In doing so, canister 101 is released from the secured position and drops downward.

In implementations, UAV 103 may land on a platform having a platform opening through which canister 101 can drop. In doing so, the rotors of UAV 103 are placed into a reverse thrust, and canister 101 is dropped through the landing platform into the platform opening.

Figures 4A, 4B, 4C:
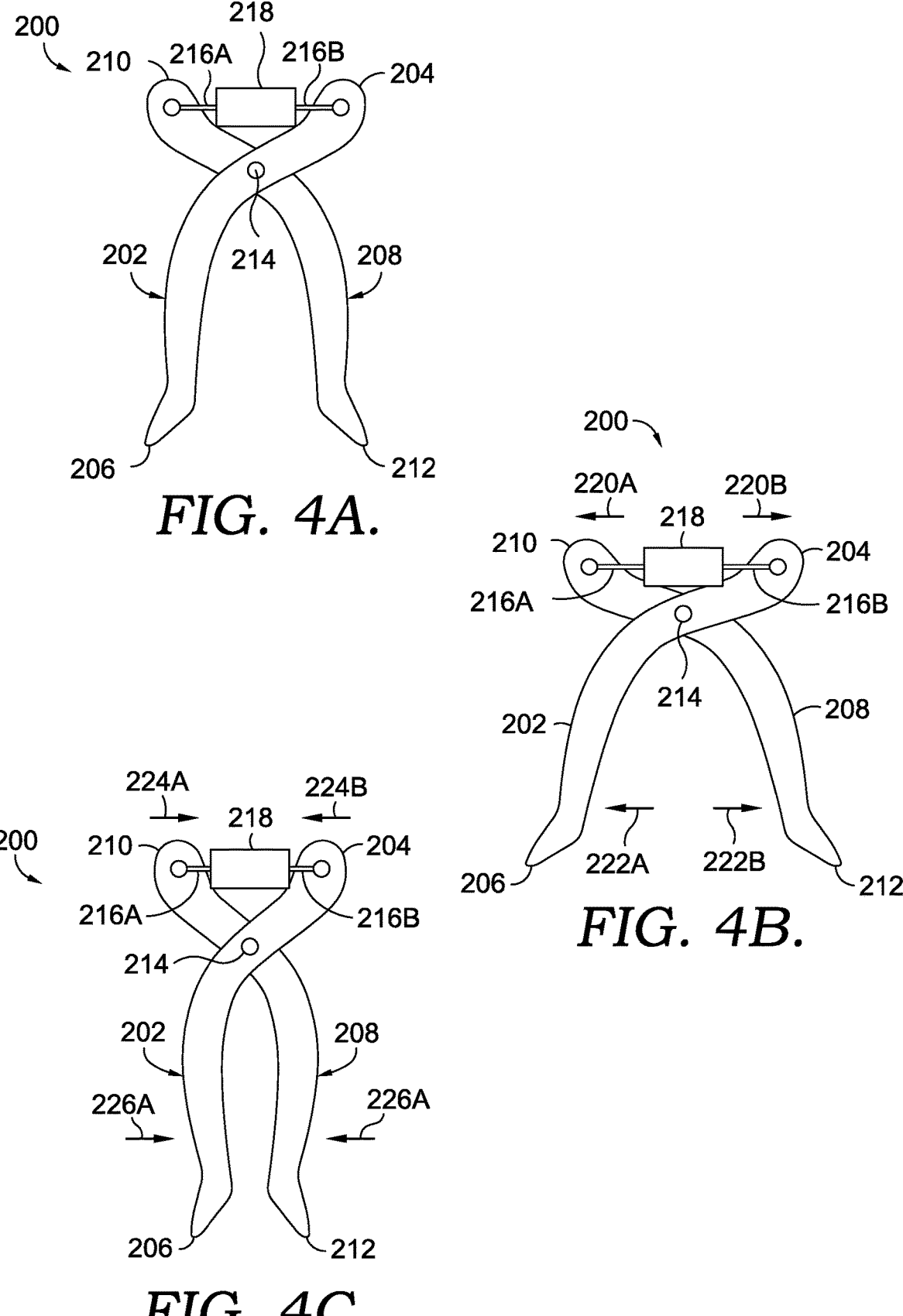
FIGS. 4A-4C illustrate an example of a clamp for carrying loads, in accordance with an embodiment described herein.

Turning now to FIGS. 4A-4C, clamp 200 is provided. Clamp 200 is suitable for use in carrying loads using a UAV. The example includes a first clamping arm 202 that extends from a first actuation end 204 to a first load end 206. Second clamping arm 208 extends from second actuation end 210 to a second load end 212. First clamping arm 202 is pivotably connected, in a crossed manner, to second clamping arm 208. First clamping arm 202 and second clamping arm 208 are connected via pin 214 between the first actuation end 204 and the first load end 206. Pin 214 is also between second actuation end 210 and the second load end 212. Clamp 200 may help to secure a load carried by a UAV. In its open state (illustrated in FIG. 4B), clamp 200 is able to retrieve a load. In its closed state (illustrated in FIG. 4C) clamp 200 secures a load by squeezing the sides of the load between first clamping arm 202 and second clamping arm 208.

Cable 216A-B connects first clamping arm 202 and second clamping arm 208, and is attached between first actuation end 204 and the second actuation end 210. First clamping arm 202 and second clamping arm 208 are pivotably coupled within an upper one half of first clamping arm 202 and second clamping arm 208. Clamp 200 is suitable for use in an outdoor area, including rooftops and other areas that are traversable by UAVs.

In implementations, first clamping arm 202 and second clamping arm 208 are pivotably coupled at a location corresponding to pin 214. While illustrated and described as a pin, it will be understood that pin 114 represents any mechanism for pivotably coupling first clamping arm 202 and second clamping arm 208. That is, first clamping arm 202 and second clamping arm 208 are configured to rotate about the location corresponding to pin 114. By rotating about the location corresponding to pin 214, clamp 200 transitions from the open state shown in FIG. 4B to the closed state shown in FIG. 4C. In aspect illustrated, clamp 200 is transitioned from the open state of FIG. 4B to the closed state of FIG. 4C using actuation device 218.

As illustrated, actuation device 218 is coupled to each of first clamping arm 202 and second clamping arm 208. Actuation device 218 is coupled to first clamping arm 202 via first cable 116A. Actuation device 218 is coupled to second clamping arm 208 via second cable 116B. First cable 116A and second cable 116B may be separate cables. In other embodiments, first cable 116A and second cable 116B respectively illustrate a first portion and a second portion of a same cable.

To transition to the open state show in FIG. 4B, actuation device 218 may permit extension of first cable 116A and second cable 116B. By doing so, first actuation end 204 moves outward and away from second actuation end 210, as illustrated using first open direction arrow 220A and second open direction arrow 220B. In doing so, first clamping arm 202 and second clamping arm 208 rotate about the location corresponding to pin 114. This causes first load 206 of first clamping arm 206 to move outward and away from second load end 212 of second clamping arm 208, as illustrated using third open direction arrow 222A and fourth open direction arrow 222B.

To transition to the closed state shown in FIG. 4C, actuation device 218 may retract first cable 116A and second cable 116B. By doing so, first actuation end 204 moves in a direction toward second actuation end 210, as illustrated using first closed direction arrow 224A and second closed direction arrow 224B. In doing so, first clamping arm 202 and second clamping arm 208 rotate about the location corresponding to pin 114. This causes first load 206 of first clamping arm 206 to move in a direction toward second load end 212 of second clamping arm 208, as illustrated using third closed direction arrow 226A and fourth closed direction arrow 226B.

In some aspects, first clamping arm 202 and second clamping arm 208 correspond to first leg 102A and second leg 102B of FIGS. 1-3. That is, first clamping arm 202 and second clamping arm 208 may have a shape corresponding to the shape of first leg 102A and second leg 102B. In aspects, actuation device 218 is suitable for use as tensioning member 110 and can be used to couple first leg 102A and second leg 102B, and to open and close first leg 102A and second leg 102B in a manner corresponding to first clamping arm 202 and second clamping arm 208.

Figure 5A:
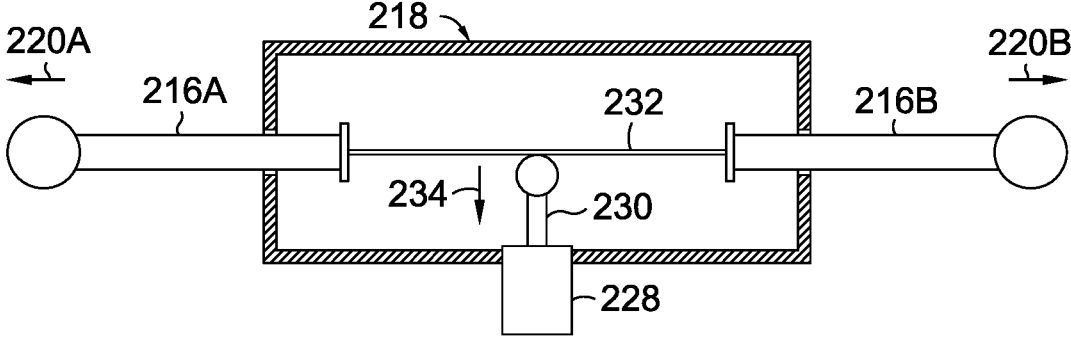
FIGS. 5A-5B illustrate an example actuation member of the clamp of FIG. 4, in accordance with embodiments described herein.
Figure 5B:
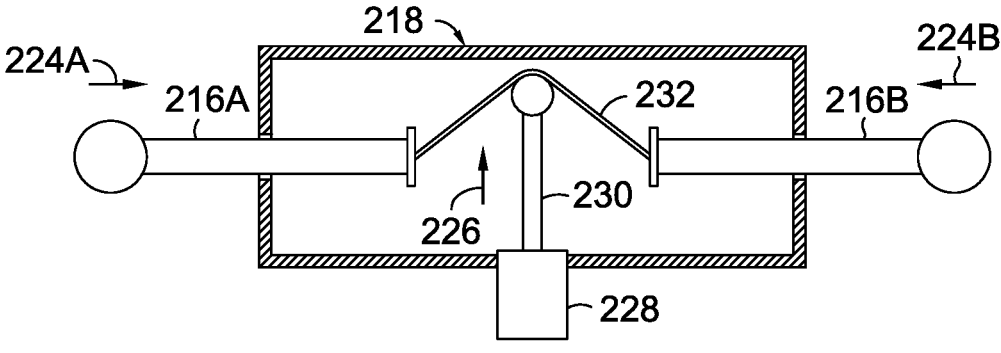

FIGS. 5A and 5B illustrate a top-down view of actuation device 218 of clamp 200. In general, actuation device 218 facilitates transitioning clamp 200 between the open state and the closed state. Actuation device 218 comprises an actuator 228 that operationally positions actuating arm 230. Actuator 228 may include any device suitable for positioning actuating arm 230, such as solenoid actuator, servo motor, hydraulic actuator, and so on.

Actuating arm 230 biases first cable 216A and second cable 216B. Actuating arm 230 can be positioned such that it contacts a portion of the cable formed by from first cable 216A and second cable 216B, or as illustrated, contacts tensioning element 232 coupled to first cable 216A and second cable 216B. Tensioning element 232 may comprises any element suitable for mechanically extending and retracting first cable 216A and second cable 216B through operation of actuating arm 230. In an example, tensioning element 232 is a bi-stable spring mechanism. In aspects, tensioning element 232 may provide an outward force in the direction of first cable 216A and second cable 216B. The use of a bi-stable spring provide some power efficiencies and benefits. In particular, bi-stable springs may be stable in two or more states. In this case, the bi-stable spring is stable when actuating arm 230 is in an extended position and a retracted position. This allows actuating arm 230 to move into an extended position, thus moving the bi-stable spring. However, in the extended position of actuating arm 230, the bi-stable spring rests in a stable position, and as such, actuating arm 230 may not have to continually apply a bias to the bi-stable spring in this position. This ultimately conserves power by not applying a constant force via actuating arm 230. As such, the bi-stable spring is stable in a first state corresponding to a retracted position of actuating arm 230 and the open state of clamp 200, while also stable in a second state corresponding to an extended position of actuating arm 230 and the closed state of clamp 200.

In FIG. 5A, actuator 228 retracts actuating arm 230 to a retracted position, illustrated using retraction direction arrow 234. In doing so, first cable 216A and second cable 216B extend in the open direction due to the outward force, illustrated using first open direction arrow 220A and second open direction arrow 220B. In this example, by retracting actuating arm 230, clamp 200 is transitioned to the open state, as illustrated in FIG. 4B.

In FIG. 5B, actuator 228 extends actuating arm 230 to an extended position, illustrated using extension direction arrow 236. By doing so, first cable 216A and second cable 216B retract in the closed direction due to the extension of actuating arm 230 contacting tensioning element 232, illustrated using first closed direction arrow 224A and second closed direction arrow 224B. In this example, by extending actuating arm 230, clamp 200 is transitioned to the closed state, as illustrated in FIG. 4C.

Said another way, FIG. 5A illustrates first cable 216A and second cable 216B in a first cable position, while FIG. 5B illustrates first cable 216A and second cable 216B in a second cable position. In the first cable position has, first actuation end 204 is separated from second actuation end 210 by a first distance, as also illustrated in FIG. 4B. When first cable 216A and second cable 216B are in the second cable position shown in FIG. 5B, first actuation end 204 is separated from second actuation end 210 by a second distance, as also illustrated in FIG. 4. The first distance may be greater than the second distance.

By transitioning between the open state and the closed state, clamp 200 can be used to secure objects, such as canisters, for transporting such objects. Clamp 200 can be coupled to a UAV to retrieve and release objects being delivered.

Embodiments described above may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of the present technology is described with specificity herein to meet statutory requirements. However, the description itself is not intended to limit the scope of this disclosure. Rather, the inventors have contemplated that the claimed or disclosed subject matter might also be embodied in other ways, to include different steps or combinations of steps similar to the ones described in this document, in conjunction with other present or future technologies. Moreover, although the terms "step" or "block" might be used herein to connote different elements of methods employed, the terms should not be interpreted as implying any particular order among or between various steps herein disclosed unless and except when the order of individual steps is explicitly stated.

For purposes of this disclosure, the word "including" or "having" has the same broad meaning as the word "comprising." In addition, words such as "a" and "an," unless otherwise indicated to the contrary, include the plural as well as the singular. Thus, for example, the constraint of "a feature" is satisfied where one or more features are present. Furthermore, the term "or" includes the conjunctive, the disjunctive, and both (a or b thus includes either a or b, as well as a and b).

From the foregoing, it will be seen that this technology is one well adapted to attain all the ends and objects described above, including other advantages that are obvious or inherent to the structure. It will be understood that certain features and subcombinations are of utility and may be employed without reference to other features and subcombinations. This is contemplated by and is within the scope of the claims. Since many possible embodiments of the described technology may be made without departing from the scope, it is to be understood that all matter described herein or illustrated the accompanying drawings is to be interpreted as illustrative and not in a limiting sense.

What is claimed is:

1. Landing gear comprising:

a first leg comprising a first leg landing end and a first leg connection end;

a second leg comprising a second leg landing end and a second leg connection end, wherein the first leg connection end is directly coupled to the second leg connection end at a first engagement location;

a first tensioning member applying a first rotational force about the first engagement location such that the first rotational force biases the first leg landing end in a first direction of the second leg landing end, wherein the first leg and the second leg are configured to rotate against the first rotational force when a downward force is applied to the first engagement location;

a third leg comprising a third leg landing end and a third leg connection end;

a fourth leg comprising a fourth leg landing end and a fourth leg connection end, wherein the third leg connection end is directly coupled to the fourth leg connection end at a second engagement location; and a second tensioning member applying a second rotational force about the second engagement location such that the second rotational force biases the third leg landing end in a second direction of the fourth leg landing end, wherein the third leg and the fourth leg are configured to rotate against the second rotational force when the downward force is applied to the second engagement location.

2. The landing gear of claim 1, wherein;

the first leg comprises a first leg curved portion that is adjacent to the first leg connection end and curves outward and away from the second leg when the first leg and the second leg are rotationally engaged, and the second leg comprises a second leg curved portion that is adjacent to the second leg connection end and curves outward and away from the first leg when the first leg and the second leg are rotationally engaged; and the third leg comprises a third leg curved portion that is adjacent to the second leg connection end and curves outward and away from the fourth leg when the third leg and the fourth leg are rotationally engaged, and the fourth leg comprises a fourth leg curved portion that is adjacent to the fourth leg connection end and curves outward and away from the third leg when the third leg and the fourth leg are rotationally engaged.

3. The landing gear of claim 1, wherein the first leg comprises a first leg straight portion adjacent to the first leg landing end, the second leg comprises a second leg straight portion adjacent to the second leg landing end, the third leg comprises a third leg straight portion adjacent to the third leg landing end, and the fourth leg comprises a fourth leg straight portion adjacent to the fourth leg landing end.

4. The landing gear of claim 1, wherein:

the first leg comprises a first leg curved portion that is adjacent to the first leg connection end and a first leg straight portion adjacent to the first leg landing end, the first leg curved portion adjoining the first leg straight portion, the second leg comprises a second leg curved portion that is adjacent to the second leg connection end and a second leg straight portion adjacent to the second leg landing end, the second leg curved portion adjoining the second leg straight portion, the third leg comprises a third leg curved portion that is adjacent to the third leg connection end and a third leg straight portion adjacent to the third leg landing end, the third leg curved portion adjoining the third leg straight portion, and the fourth leg comprises a fourth leg curved portion that is adjacent to the fourth leg connection end and a fourth leg straight portion adjacent to the fourth leg landing end, the fourth leg curved portion adjoining the fourth leg straight portion.

5. The landing gear of claim 1, wherein the first leg landing end comprises a first landing wheel the second leg landing end comprises a second landing wheel, the third leg landing end comprises a third landing wheel, the fourth leg landing end comprises a fourth landing wheel, the first landing wheel is configured to move in a direction away from the second landing wheel, and the third landing wheel is configured to move in the direction away from the fourth landing wheel.

6. The landing gear of claim 1, wherein the first leg landing end comprises a first landing wheel rotating about a first axel, the second leg landing end comprises a second landing wheel rotating about a second axel, the third leg landing end comprises a third landing wheel rotating about the first axel, the fourth leg landing end comprises a fourth landing wheel rotating about the second axel, and the first axel extends parallel to the second axel.

7. The landing gear of claim 1, wherein the first leg landing end comprises a first landing wheel, the second leg landing end comprises a second landing wheel, the third leg landing end comprises a third landing wheel, the fourth leg landing end comprises a fourth landing wheel, and each of the first landing wheel, the second landing wheel, the third landing wheel, and the fourth landing wheel rotatesrotating within a same theoretical plane of rotation.

8. An unmanned aerial vehicle comprising:

landing gear comprising:

a first leg comprising a first leg landing end and a first leg connection end;

a second leg comprising a second leg landing end and a second leg connection end, wherein the first leg connection end is directly coupled to the second leg connection end at an engagement location; and a tensioning member applying a rotational force about the engagement location such that the rotational force biases the first leg landing end in a direction of the second leg landing end, wherein the first leg and the second leg are configured to rotate against the rotational force when a downward force is applied to the engagement location.

9. The unmanned aerial vehicle of claim 8, wherein the first leg comprises a first leg curved portion that is adjacent to the first leg connection end and curves outward and away from the second leg when the first leg and the second leg are rotationally engaged, and the second leg comprises a second leg curved portion that is adjacent to the second leg connection end and curves outward and away from the first leg when the first leg and the second leg are rotationally engaged.

10. The unmanned aerial vehicle of claim 8, wherein the first leg comprises a first leg straight portion adjacent to the first leg landing end, and the second leg comprises a second leg straight portion adjacent to the second leg landing end.

11. The unmanned aerial vehicle of claim 8, wherein the first leg comprises a first leg curved portion that is adjacent to the first leg connection end and a first leg straight portion adjacent to the first leg landing end, the first leg curved portion adjoining the first leg straight portion, and the second leg comprises a second leg curved portion that is adjacent to the second leg connection end and a second leg straight portion adjacent to the second leg landing end, the second leg curved portion adjoining the second leg straight portion.

12. The unmanned aerial vehicle of claim 8, wherein the first leg landing end comprises a first landing wheel and the second leg landing end comprises a second landing wheel, and the first landing wheel is configured to move in a direction away from the second landing wheel.

13. The unmanned aerial vehicle of claim 8, wherein the first leg landing end comprises a first landing wheel rotating about a first axel and the second leg landing end comprises a second landing wheel rotating about a second axel, the first axel extending parallel to the second axel.

14. The unmanned aerial vehicle of claim 8, wherein the first leg landing end comprises a first landing wheel and the second leg landing end comprises a second landing wheel, each of the first landing wheel and the second landing wheel rotating within a same theoretical plane of rotation.

15. A method comprising:

positioning an unmanned aerial vehicle (UAV) such that a gap formed from a first leg of a landing gear and a second leg of the landing gear is at a location proximate a canister, wherein:

the first leg comprises a first leg landing end and a first leg connection end;

the second leg comprises a second leg landing end and a second leg connection end, wherein the first leg connection end is configured to rotationally engage the second leg connection end of the second leg at an engagement location; and a tensioning member applies a rotational force about the engagement location such that the rotational force biases the first leg landing end in a direction of the second leg landing end when the first leg and the second leg are rotationally engaged;

securing the canister between the first leg and the second leg by lowering the UAV;

landing the UAV; and releasing the canister by placing a rotor into a reverse thrust to generate a downward force that rotates the first leg and the second leg.

16. The method of claim 15, wherein the first leg comprises a first leg curved portion that is adjacent to the first leg connection end and curves outward and away from the second leg when the first leg and the second leg are rotationally engaged, and the second leg comprises a second leg curved portion that is adjacent to the second leg connection end and curves outward and away from the first leg when the first leg and the second leg are rotationally engaged.

17. The method of claim 15, wherein the first leg comprises a first leg straight portion adjacent to the first leg landing end, and the second leg comprises a second leg straight portion adjacent to the second leg landing end.

18. The method of claim 15, wherein the first leg comprises a first leg curved portion that is adjacent to the first leg connection end and a first leg straight portion adjacent to the first leg landing end, the first leg curved portion adjoining the first leg straight portion, and the second leg comprises a second leg curved portion that is adjacent to the second leg connection end and a second leg straight portion adjacent to the second leg landing end, the second leg curved portion adjoining the second leg straight portion.

19. The method of claim 15, wherein the first leg landing end comprises a first landing wheel and the second leg landing end comprises a second landing wheel, and the first landing wheel is configured to move in a direction away from the second landing wheel.

20. The method of claim 15, wherein the first leg landing end comprises a first landing wheel rotating about a first axel and the second leg landing end comprises a second landing wheel rotating about a second axel, the first axel extending parallel to the second axel.

* * * * *